United States Patent [19]

Krutchen

[11] Patent Number: 5,269,948

[45] Date of Patent: Dec. 14, 1993

[54] DECONTAMINATION OF POLYSTYRENE

[75] Inventor: Charles M. Krutchen, Pittsford, N.Y.

[73] Assignee: Mobil Oil Corporation, Fairfax, Va.

[21] Appl. No.: 933,125

[22] Filed: Aug. 21, 1992

Related U.S. Application Data

[63] Continuation-in-part of Ser. No. 600,796, Oct. 22, 1990, abandoned.

[51] Int. Cl.$^5$ .............................................. B01D 35/18
[52] U.S. Cl. ................................... 210/774; 210/767; 210/805; 521/40; 521/47; 528/48
[58] Field of Search ............... 521/40, 47; 528/48; 210/767, 774, 805

[56] References Cited

U.S. PATENT DOCUMENTS 3,736,271  5/1973  Schutze et al. ....................... 521/47
4,517,312  5/1985  Kumasaka et al. ................... 521/47

OTHER PUBLICATIONS

Brundrup et al., "Polymer Handbook", 2nd Edition, John Wiley and Sons, pp. IV-241, IV-242 and IV 248, 1975.

Primary Examiner—Robert A. Dawson
Assistant Examiner—David Reifsnyder
Attorney, Agent, or Firm—A. J. McKillop; G. W. Hager; J. P. O'Sullivan

[57] ABSTRACT

A method of decontaminating waste contaminated polystyrene involves dissolving the contaminated product in liquid styrene monomer at about room temperature and recovering the contaminant-free solution. The solution can be used as part of styrene feed stock for polymerization of styrene.

2 Claims, No Drawings

DECONTAMINATION OF POLYSTYRENE

This is a continuation-in-part of U.S. patent Ser. No. 07/600,796, filed on Oct. 22, 1990, now abandoned.

BACKGROUND OF THE INVENTION

The present invention relates to a process for decontaminating post-consumer-use waste contaminated polystyrene. The present process is directed to recovering polystyrene resin by processing the waste resin product.

Polystyrene, in foamed or unfoamed form, is an indispensable material in present-day low-cost packaging. Supermarkets and fast-food restaurants use thermoformed polystyrene products in enormous quantities. They are low-cost, attractive packaging products which have short lifetimes but, along with a superb utility in relation to food products, they also present a formidable waste disposable problem. The industry is constantly on the lookout for better disposal means for these used products as alternatives to merely transporting them to a landfill for either incineration or burial. U.S. Pat. No. 4,517,312, issued to Kumasaka et al. and assigned to Toyo Rubber Chemical Industry Company, Ltd., describes a process for regenerating polystyrene resin from waste contaminated polystyrene. This technique, however, involves the use of organic solvents and water. The subsequent removal of these organic solvents and water to reclaim the regenerated polymer can be economically unattractive.

If a process for decontaminating polystyrene can be successfully proposed, such a process will contribute much to the solution of the commercial and post consumer waste problem and permit the conservation of resources.

SUMMARY OF THE INVENTION

The present invention relates to a method of purifying and recovering a polystyrene product from post consumer waste contaminated polystyrene product comprising:

(a) subjecting said waste contaminated product to the solvent action of styrene monomer, to form a polystyrene product-styrene monomer solution at a temperature below that which would cause the beginning of any substantial styrene polymerization; and (b) separating insoluble contaminants from said solution.

The method may further include employing at least part of the contaminant-free solution as at least part of the feed stock in a bulk suspension or bulk continuous process for forming polystyrene from the styrene of said solution.

DETAILED DESCRIPTION OF THE INVENTION

The term "waste contaminated polystyrene product" is meant to include any foamed or unfoamed polystyrene material which has become contaminated during the product's useful life. Of course, the usual situation involves the contact of polystyrene with food products, usually in a fast-food or supermarket environment. In these instances, the waste is leftover and discarded food and drink products which are in surface contact with the polystyrene foam or sheet container or tray. There may, of course, be other polystyrene contaminants which are not of a food or drink nature. For example, polystyrene beads are molded into a variety of shapes and structures other than coffee cups, such as packing material, members used as spacers to keep fragile product separated, etc. During the useful life of these materials, they can become contaminated with whatever dirt and debris of the environment with which they come into contact.

The term "polystyrene product" as employed herein is to be understood in its broadest sense so as to include not only polystyrene but para-methylstyrene, para-t-butylstyrene, monochlorostyrene, dichlorostyrene, impact polystyrene, blends of polystyrene and other polymers, for example, polystyrene and polyphenylene oxide, etc.

The technique of the present invention is elegant in its simplicity. The contaminated polystyrene product is merely fed into a volume of liquid styrene monomer, which monomer is at a temperature suited to effectively dissolve the polystyrene.

Polystyrene is one of the few polymers that is soluble in its monomer. Solution occurs very rapidly at room temperature or thereabout. Since the polymerization of styrene is effected merely by heating, polymerization temperatures must be avoided during the decontamination process. If higher temperatures can somehow be tolerated without polymerization, this is, of course, within the scope of the invention. Thus, the solution of waste polystyrene occurs in the range of from just below to just above room temperature. Generally this means between about 60°-76° F. and preferably at about 68°-72° F.

The following are other known solvents for polystyrene: cyclohexane (above 35° C.), cyclohexane/acetone, methylcyclohexane/acetone, decahydronaphthalene/diethyl oxalate, benzene, toluene, ethylbenzene, lower chlorinated aliphatic hydrocarbons, phenol/acetone, THF, dimethyltetrahydrofuran, dioxane, methyl ethyl ketone, diisopropyl ketone, cyclohexanone, glycol formal, ethyl acetate, butyl acetate, methyl-, ethyl-, n-butyl phthalate, 1-nitropropane, carbon disulfide, tributyl phosphate, phosphorous trichloride. All perhaps could be used to purify contaminated polystyrene by a solution-filtration-PS recovery from solvent method, but this would be prohibitively expensive in comparison to the present simple solution technique. Styrene is unique as the only solvent for polystyrene that has practical utility for purifying waste polystyrene. This is because the solvent, styrene, does not have to be separated from its solute, polystyrene. Styrene-polystyrene solution is the only combination that can be used as feed stock for polystyrene manufacture.

The common waste products such as hamburger particles, bread and rolls, the usual fast-food condiments, milk, soft drinks, fish particles, remain undissolved in the styrene monomer. Although it is intended that the solution process (scrap polystyrene dissolved into styrene) occurs at a polymerization plant site, it is understood that, if convenient, the scrap polystyrene may be dissolved in the styrene monomer at earlier stages in the waste return process. At some convenient polystyrene concentration in the styrene monomer, the solution can be separated by any convenient means from the excluded waste material.

The means for separating the polystyrene-styrene solution from the waste material includes filtration, or countercurrent washing for dissolved contaminants or for undissolved liquid contaminants, or continuous solution stream withdrawal, etc.

As indicated above, the recovered polystyrene-styrene monomer solution has utility as a feedstock or contributing feedstock in a commercial styrene polymerization process. Basically, styrene monomer is simply heated to its polymerization temperature and polystyrene is removed from the system. The recovered product of the present invention can be blended with styrene monomer feedstock and utilized as the sole or a contributing factor in the formation of polystyrene in a bulk suspension (using an appropriate initiator) or continuous process. In the following example, "thermally densified" means heated contaminated foamed or unfoamed polystyrene to decrease bulk volume and increase its density. Temperatures may reach carbonization temperatures for the food contaminants.

The present invention is now described by way of Examples.

EXAMPLE 1

440 lbs. of thermally densified waste contaminated polystyrene foam fast-food containers which had been adherently contacted with the usual output of a fast-food restaurant, e.g., meat and fish sandwiches, French fries, soft drink, milk, condiments, etc., were dissolved in 1,600 lbs. of liquid styrene monomer at room temperature. With moderate stirring, the polystyrene rapidly dissolved in the styrene monomer over a period of 30 minutes. A sample of the overall mixture in its quiescent state revealed a noticeable surface scum and some floating particles within the solution. The system was filtered through a 5 micron filter to yield a surprisingly clear solution product.

EXAMPLE 2

Employing a laboratory scale, styrene polymerization process, the filtered solution of Example 1 which contained approximately 20% of polystyrene and 80% styrene was employed as the styrene feedstock to the polymerization process. The polymerization process was carried out to 80% solids (25% post consumer recycle) yielding a polystyrene product which appeared indistinguishable from virgin polystyrene. During the polymerization process, temperatures reached 140° C. which effectively sterilizes any remaining bacteria which may have carried over from the process of Example 1.

It is clear that by the technique described above, an effective process has been presented, not only to greatly contribute to the elimination of a waste disposal problem but done so in a manner which provides an effective economical use for the recovered polystyrene-styrene solution.

What is claimed is:

1. A method for purifying waste contaminated polystyrene and forming additional polystyrene comprising:
    (a) subjecting said waste contaminated polystyrene to the solvent action of styrene monomer to form a polystyrene-styrene monomer solution distinct from insoluble contaminants, said solvent action occurring at a temperature below that which would cause the beginning of any substantial styrene polymerization;
    (b) separating insoluble contaminants from said solution; and
    (c) employing the contaminant-free solution as at least part of the feed stock in a process comprising a bulk suspension or bulk continuous process for forming polystyrene from styrene wherein said bulk suspension or bulk continuous process includes heating said polystyrene-styrene solution to polymerize said monomer.

2. The method of claim 1 wherein said contaminant-free solution is heated to about 140° C.

* * * * *